United States Patent [19]

Kunde et al.

[11] 4,317,234
[45] Feb. 23, 1982

[54] TELEPHONE SUBSCRIBER STATION

[75] Inventors: Gerhard Kunde, Munich; Siegfried Schoen, Starnberg, both of Fed. Rep. of Germany

[73] Assignee: Siemens Aktiengesellschaft, Berlin & Munich, Fed. Rep. of Germany

[21] Appl. No.: 197,562

[22] Filed: Oct. 16, 1980

[30] Foreign Application Priority Data

Oct. 30, 1979 [DE] Fed. Rep. of Germany ....... 2943866

[51] Int. Cl.³ .............................................. H04B 9/00
[52] U.S. Cl. .................................... 455/606; 455/617
[58] Field of Search .......................... 455/606, 607, 617

[56] References Cited

U.S. PATENT DOCUMENTS 3,710,122  1/1973  Burcher .............................. 455/606

FOREIGN PATENT DOCUMENTS 2823931  12/1979  Fed. Rep. of Germany .

Primary Examiner—Howard Britton
Attorney, Agent, or Firm—Hill, Van Santen, Steadman, Chiara & Simpson

[57] ABSTRACT

A multifrequency signaling method is provided between a cordless hand set and a base set which normally operates with audio frequency/pulse phase modulation and pulse phase modulation/audio frequency conversion. The cordless hand set is provided with a dialing device and a frequency generator for providing frequency combinations corresponding to dialed digits or special characters. In the base set a monitoring circuit monitors the existence of optical transmission channels between the hand set and the base set and causes disconnection after a loss of such channels for a predetermined interval. The base set also includes a converter for converting the multifrequency signals to dial pulse signals and a special character evaluation circuit for providing corresponding signals to control various functions such as signaling a secretary, through connection of a call and disconnection of a call.

4 Claims, 4 Drawing Figures

TELEPHONE SUBSCRIBER STATION

BACKGROUND OF THE INVENTION

1. Field of the Invention

The present invention relates to a telephone subscriber station having a base set connected to the telephone network and a cordless hand set, with a first transmission path which contains a first low frequency/pulse phase modulation (NF/PPM) converter and a first infrared (IR) pulse transmitter in the base set and, connected by way of a first optical transmission channel, comprises a first IR pulse receiver and a first pulse phase modulation/low frequency (PPM/NF) converter in the cordless hand set, and a second transmission path which comprises a second NF/PPM converter and a second IR pulse transmitter in the cordless hand set and, connected by way of a second optical transmission channel, includes a second IR pulse receiver and a second PPM/NF converter in the base set, and which includes a delay circuit for phase synchronization in the base set and a dial and/or calling device in the hand set.

2. Description of the Prior Art

Such a telephone subscriber station is generally disclosed in the German published application No. 2,823,931 and its operation is described below on the basis of FIGS. 1 and 2, on which FIG. 1 is a block diagram of a telephone subscriber station according to the aforementioned German application and FIG. 2 is a pulse diagram for pulse phase modulation for such a station.

The abbreviations employed herein have the following meanings:
PPM=pulse phase modulation;
NF=audio (low) frequency;
MFV=multifrequency method;
IWV=pulse selection method;
IR=infrared;
MFS=multifrequency signal in the transmission section; and
MFE=multifrequency signal in the receiving section.

The block diagram of FIG. 1 illustrates a base set 1 and a cordless hand set 2.

The base set 1 comprises an IR pulse transmitter 4, an IR pulse receiver 8, a PPM/NF converter 19, a NF/PPM converter 20, a sawtooth generator 21, a delay circuit 22 and optionally, a telephone set 15 having a cord and a dialing device, as well as a power supply 24.

The cordless hand set 2 comprises an IR pulse transmitter 7, an IR pulse receiver 5, a NF/PPM converter 25, a PPM/NF converter 26, a sawtooth generator 27, a microphone 28, a receiver ear piece 29, a call or dialing device 30 and a power supply 31.

When a speech signal appears on the leads 23 of the subscriber line, the speech signal is converted into PPM signals in the NF/PPM converter 20 and is transmitted into the optical transmission channel 3 by way of the IR pulse transmitter 4. This signal is received by the IR pulse receiver 5 and is fed to the receiver ear piece 29 by way of the PPM/NF converter 26. A reply returns to the leads 23 of the subscriber line by way of the microphone 28, the NF/PPM converter 25, the IR pulse transmitter 7, the optical transmission channel 6, the IR pulse receiver 8 and the PPM/NF converter 19.

A dialing device can be located in the base set 1 and/or in the cordless hand set 2. The arrangement 30 and the cordless hand set 2 can be either a call or a dial device. If this is only a matter of a call device, then the selection of a called party must be carried out by a person at the base set. If the arrangement 30, however, is a dialing device, then the called party can be directly selected.

The NF/PPM converter 25 and the PPM/NF converter 26 are driven from a common sawtooth generator 27 and the NF/PPM converter 20 and the PPM/NF converter 19 are driven by a common sawtooth generator 21. The synchronization of the sawtooth generator 21 with the sawtooth generator 27 occurs by way of a delay circuit 22, preferably a phase locked loop.

FIG. 2 illustrates a pulse diagram for the PPM transmission between the hand set and the base set.

The sawtooth wave c is generated by a free-running sawtooth generator 27 of the hand set; whereas the sawtooth wave g is generated by the sawtooth generator of the base set. A sawtooth period of, for example, 125 $\mu$s, is divided into two channels K1 and K2. PPM pulses are transmitted in the channel K1 from the hand set to the base set, while PPM pulses are transmitted in the channel K2 from the base set to the hand set. A PPM pulse a is emitted by the IR pulse transmitter 7 of the hand set and is received, now referenced d, by the IR pulse receiver 8 of the base set. The PPM pulse e is transmitted by the IR pulse transmitter 4 of the base set and, referenced b at the receiving side, is received by the IR pulse receiver 5 of the hand set. The swing of the PPM pulses amounts to approximately $\pm 30$ $\mu$s.

Dial signals are transmitted from the hand set to the base set in a variation of a pulse dial method. This requires considerable circuit expense and is unsuitable for permutation code switching.

SUMMARY OF THE INVENTION

The present invention is based on the object of providing a suitable dialing device in the hand set for quick permutation code switching and of guaranteeing a sure transmission of the dial signals.

Beginning with a telephone subscriber station of the type set forth above, this object is achieved, according to the present invention, in that a dialing device suitable for permutation code switching emitting dial and/or special characters is provided in the hand set, that a frequency generator controlled by the dialing device is provided which emits a multifrequency signal assigned to each dial or special character and consisting of at least two superimposed audio frequencies, the multifrequency signal being converted into a PPM signal by the second NF/PPM converter, and in that the PPM signal is again converted into a multifrequency signal at the base set by the first PPM/NF converter.

The advantages achieved in practicing the present invention is that the dialing signals are securely transmitted by employing the multifrequency method. Since a specific frequency combination is transmitted for each dial or special character, the dialing duration is significantly shorter than with the standard pulse dial method. An optimum transmission given low transmitting power is possible by the conversion of the multifrequency signals into PPM signals.

The possibility of transmitting special characters according to the multifrequency method is also advantageous. A special character evaluation circuit is provided in the base set, which causes versatile control functions. Therefore, for example, one's secretary can be called or the telephone connection can be disconnected by actions initiated at the hand set.

It is of advantage for the practical application of the invention when a monitoring circuit is provided in the base set which emits an error signal given a disruptive connection between the hand set and the base set, the error signal, for example, disconnecting the telephone connection to the exchange given an interruption of the transmission path which lasts for a predetermined longer time.

BRIEF DESCRIPTION OF THE DRAWINGS

Other objects, features and advantages of the invention, will be best understood from the following detailed description, taken in conjunction with the accompanying drawings, on which.

DESCRIPTION OF THE PREFERRED EMBODIMENTS

Figure 1:
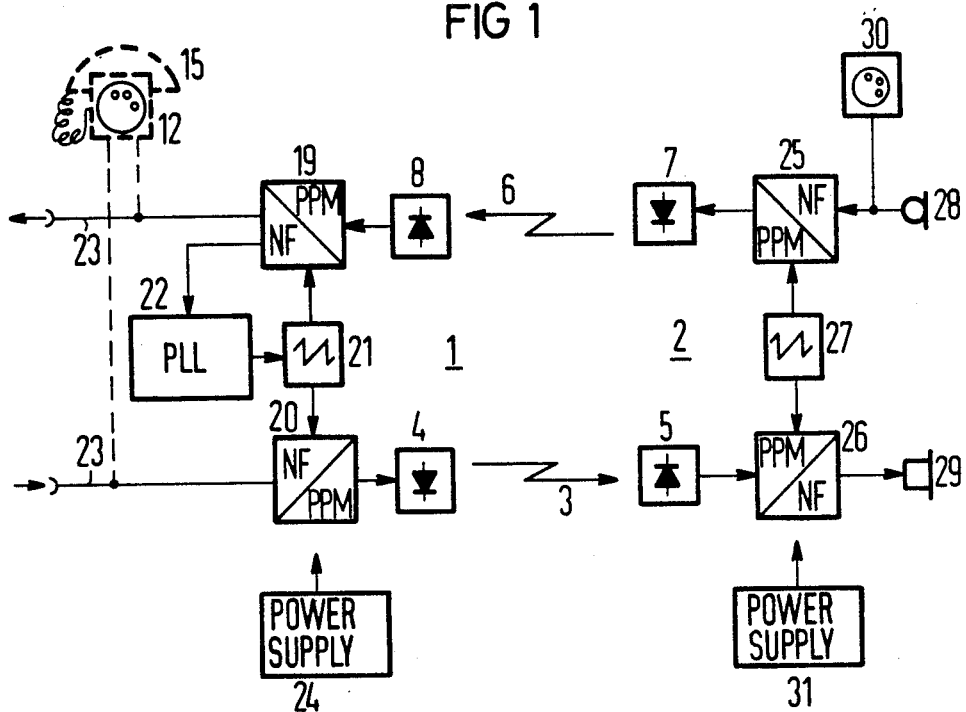
FIG. 1 is a block diagram of a known telephone subscriber station.
Figure 2:
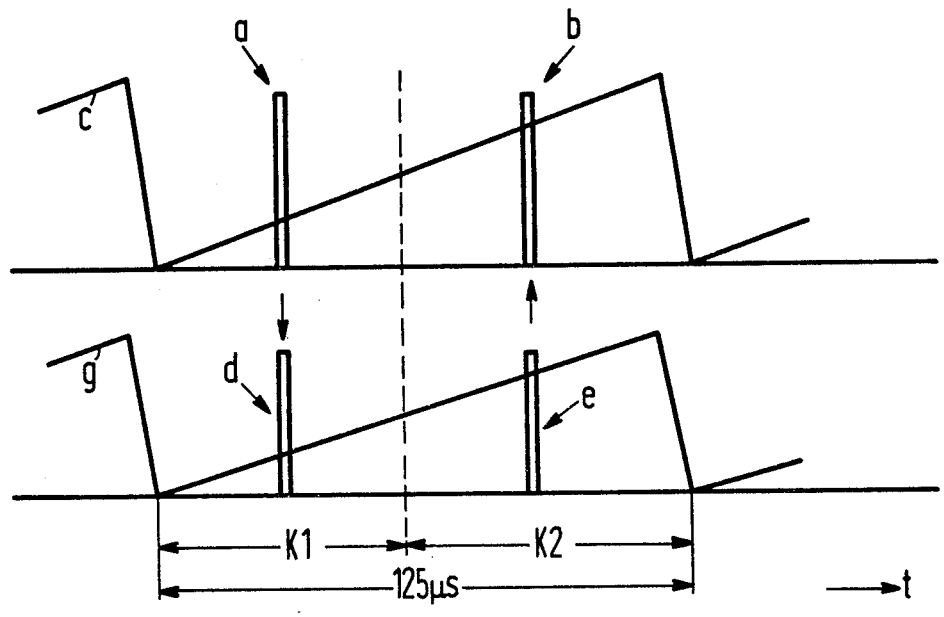
FIG. 2 is a pulse diagram for pulse phase modulation in the operation of the subscriber station of FIG. 1.
Figure 3:
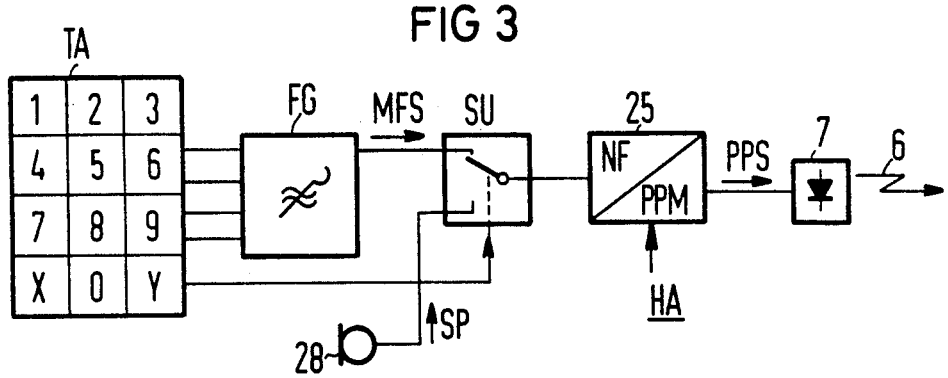
FIG. 3 is a block diagram of an exemplary embodiment of the invention located in the transmitting portion of a hand set.
Figure 4:
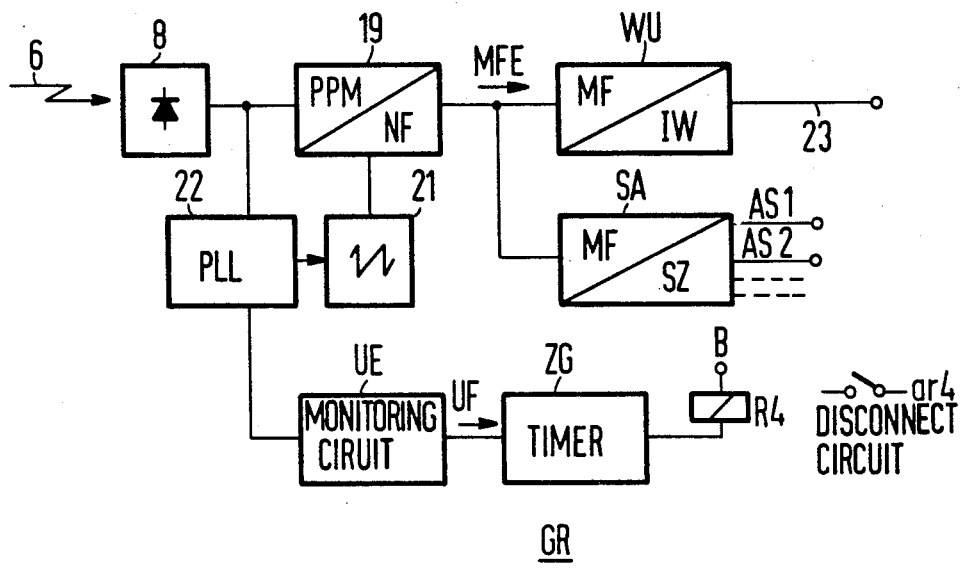
FIG. 4 is a block diagram of an exemplary embodiment of the receiving portion of the base set operable in conjunction with the transmission portion of FIG. 3.

FIGS. 1 and 2 have been discussed above and will not be dealt with further except as the same may relate to FIGS. 3 and 4.

The hand set HA of FIG. 3 is identical, in its essential parts, to the hand set 2 described with respect to FIG. 1. For reasons of simplicity, only the transmission portion of the hand set HA has been illustrated in FIG. 3. The call or dial device 30 of the original hand set 2 has been replaced, according to the present invention, by a dial device TA and a frequency generator FG. Dial signals 0-9 as well as special characters, for example, X, Y, can be transmitted by the dial device TA suited for permutation code switching. The dial device controls a frequency generator FG which transmits a frequency combination MFS at its output which corresponds to the dial or special character selected, the frequency combination MFS comprising at least two different frequencies. The multifrequency generator, for example, comprises two commercially available frequency generators or, respectively, oscillator circuits. The frequency of a single generator is altered in that the frequency-determining components are changed. For example, capacitance of the difference size are connected to the individual frequency generator by way of the dialing device TA. The output voltages of the two frequency generators are added and produce the output signal MFS of the frequency generator FG. A multifrequency generator similar to the type described exists as an integrated module MK 5087 (N) "Integrated Tone Dialer" manufactured by the Mostek Company, Carrollton, Tex. A transfer switch SU is controlled by way of a further output of the dial device TA given the emission of dial or special characters in such a manner that the frequency combination MFS is applied to the input of the NF/PPM converter 25. The frequency combination is converted by the NF/PPM converter 25 into a pulse phase modulated signal PPS and is supplied to the IR pulse transmitter 7 which emits the signal by way of a transmission channel 6. If speech is transmitted instead of a dial or special character, then the transfer switch SU through connects the speech signal SP arriving from the microphone 28 to the NF/PPM converter 25.

The receiving portion of the base set GR of the telephone subscriber station is illustrated in FIG. 4. The receiving portion comprises, as the same does with respect to FIG. 1, and IR pulse receiver 8, the PPM/NF converter 19 connected to the pulse receiver, the delay circuit 22 and the sawtooth generator 21. Added thereto in the base set GR are a MFV/IWV converter WU connected to the output of the PPM/NF converter 19, the output of the MFV/IWV converter WU being connected to the subscriber line 23, a special character evaluation circuit SA connected to the output of the PPM/NF converter 19, and a monitoring circuit UE having a timer ZG, connected to the output of the delay circuit 22.

The purpose of the MFV/IWV converter WU is to convert the MFV dialing characters into standard dial pulses according to the pulse selection method. If the telephone exchange is in a position to process MFV dialing characters per se, the converter WU can be omitted so that the output 23 appears at the output of the PPM/NF converter 19. The MFV/IW converter WU is a commercially available component as is already employed in communications systems. Since it is not essential to the invention, the same will not be described in further detail herein.

The special character evaluation circuit SA is likewise connected to the output of the PPM/NF converter 19. When special characters are received, consisting of a frequency combination of at least two frequencies, the special character evaluation circuit SA emits a signal at its outputs AS1, AS2 . . . which corresponds to the received special character. By so doing, various functions can be performed, for example, calling one's secretary, receiving the call and disconnection the connection.

The character evaluation circuit, for example, comprises for each received frequency of the MFS signal a special bandpass filter and a simple demodulator. If two frequencies are used, the outputs of always two demodulators are connected with the two inputs of an AND-gate.

A monitoring circuit UE is connected to the delay circuit 22, the monitoring circuit UE monitoring the synchronization between its own sawtooth generator 21 and the received PPM pulses. Thereby, the monitoring circuit determines whether the connection between the hand set and the base set exists by way of the optical transmission channels 3 and 6. If the connection is disrupted, the monitoring circuit UE emits an error signal UF at its output. If the error signal UF exists for a predetermined period of time at the input of the timer ZG, the timer ZG emits a signal which triggers the disconnection of the telephone connection. The terminal disconnection is effective, for example, by a relay R4 and its contact ar4 located in a disconnect circuit.

Depending on the type of relay device, the connection point B of the relay is connected to a supply voltage or to ground.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a telephone subscriber station of the type in which a base set and a cordless hand set are coupled via first and second transmission paths, in which the first transmission path comprises a first low frequency/pulse phase modulation converter driving a first infrared transmitter in the base set, and a first infrared receiver coupled to the first infrared transmitter via a first optical channel and driving a first pulse phase modulation/low frequency converter in the hand set, in which the second transmission path comprises a second low frequency/pulse phase modulation converter driving a second infrared transmitter in the hand set and a second infrared receiver coupled to said second infrared transmitter via a second optical channel and driving a second pulse phase modulation/low frequency converter in the base set, in which the base set and the hand set include respective sawtooth generators connected to their respective converters and the base set includes a synchronizing circuit connected between the second pulse phase modulation/low frequency converter and the respective sawtooth generator, and in which a signaling device is provided in the hand set and connected to the second low frequency/pulse phase modulation converter, the improvement wherein:

the signaling device comprises
   a selection device operable to produce selection signals corresponding to calling characters and special function characters; and a frequency generator connected to said selection device and to said second low frequency/pulse responsive phase modulation converter and responsive to a selection signal to produce a corresponding multifrequency signal for conversion and transmission to the base set for reconversion by the second pulse phase modulation/low frequency converter.

2. The improved subscriber station of claim 1, wherein the base set comprises:
   a special character evaluation circuit including an input connected to the second pulse phase modulation/low frequency converter and a plurality of outputs corresponding to the special characters and operable in response to a reconverted special character signal to produce an output signal at the respective output.

3. The improved subscriber station of claim 1, wherein the base set comprises:
   a monitoring circuit connected to the synchronization circuit and operable to emit a signal in response to and during loss of synchronization.

4. The improved subscriber station of claim 3, wherein the base set comprises:
   a substation disconnect circuit including a disconnect relay; and
   a timer connected between said monitoring circuit and said relay and operable to operate said relay in response to the signal from said monitoring circuit exceeding a predetermined interval.

* * * * *